United States Patent
White (10) Patent No.: US 11,416,594 B2
(45) Date of Patent: Aug. 16, 2022

(54) METHODS AND SYSTEMS FOR ENSURING A USER IS PERMITTED TO USE AN OBJECT TO CONDUCT AN ACTIVITY

(71) Applicant: Daon Enterprises Limited

(72) Inventor: Conor Robert White, Fairfax, VA (US)

(73) Assignee: DAON ENTERPRISES LIMITED, Floriana (MT)

( * ) Notice: Subject to any disclaimer, the term of this patent is extended or adjusted under 35 U.S.C. 154(b) by 287 days.

(21) Appl. No.: 16/860,351

(22) Filed: Apr. 28, 2020

(65) Prior Publication Data

US 2021/0334347 A1 Oct. 28, 2021

(51) Int. Cl.
*G06F 12/00* (2006.01)
*G06F 21/32* (2013.01)
*G06K 19/06* (2006.01)
*G06K 17/00* (2006.01)
*G06V 40/13* (2022.01)
*G06V 40/12* (2022.01)

(52) U.S. Cl.
CPC ......... *G06F 21/32* (2013.01); *G06K 17/0022* (2013.01); *G06K 19/06037* (2013.01); *G06V 40/13* (2022.01); *G06V 40/1382* (2022.01)

(58) Field of Classification Search
CPC ..... G06F 21/32; G06F 21/35; G06K 17/0022; G06K 19/06037; G06V 40/13; G06V 40/1382; G06V 40/172
See application file for complete search history.

(56) References Cited

U.S. PATENT DOCUMENTS

| | | | |
|---|---|---|---|
| 2008/0019578 A1* | 1/2008 | Saito ................ | G06K 19/07354 382/115 |
| 2009/0037744 A1* | 2/2009 | Harrow ................. | G07F 19/201 713/186 |
| 2013/0232082 A1* | 9/2013 | Krawczewicz ........ | G16H 10/60 705/55 |
| 2015/0254662 A1* | 9/2015 | Radu .................... | G06Q 20/202 705/21 |
| 2016/0352713 A1 | 12/2016 | Grissen et al. | |
| 2017/0329777 A1* | 11/2017 | Vlugt ................. | G06Q 20/4016 |
| 2019/0073461 A1* | 3/2019 | Grissen .......... | G06Q 10/063114 |
| 2021/0312465 A1* | 10/2021 | Hou ..................... | G06Q 20/405 |
| 2021/0365530 A1* | 11/2021 | Levitov ................ | G06V 40/171 |

* cited by examiner

*Primary Examiner* — Thien M Le
(74) *Attorney, Agent, or Firm* — Kevin McDermott, Esq.

(57) ABSTRACT

A method for ensuring a user is permitted to conduct an activity is provided that includes the steps of capturing, using a computing device, data for a biometric modality of a user and identifying information of an object. The method also includes transmitting, via a network, the captured biometric modality data and identifying information to a computer and conducting a verification transaction based on the captured biometric modality data to verify the identity of the user. When the identity of the user is successfully verified, a verification transaction is conducted based on the captured object identifying information and the user is permitted to use the object to conduct the activity when the object is successfully verified.

20 Claims, 4 Drawing Sheets

METHODS AND SYSTEMS FOR ENSURING A USER IS PERMITTED TO USE AN OBJECT TO CONDUCT AN ACTIVITY

BACKGROUND OF THE INVENTION

This invention relates generally to authenticating users, and more particularly, to methods and systems for ensuring a user is permitted to use an object to conduct an activity.

People use many different objects to conduct many different activities. For example, people are known to operate vehicles, open medicine cabinet doors to access and take prescription drugs, and to smoke a vaping device in order to stop smoking tobacco cigarettes. Some objects have security features but others have none. For example, vehicles have locks but medicine cabinets and objects like vaping devices have little or no security features.

This lack of security features has been known to enable people to operate such objects to their detriment. For example, teenagers have been known to circumvent vehicle locks to operate automobiles and sustain serious and deadly injuries as a result. Moreover, teenagers have been known to abuse prescription drugs obtained from a home medicine cabinet and to suffer unexplained illnesses and death as a result of smoking a vaping device. As a result, companies and other entities that manufacture and/or sell such objects may suffer decreased sales and reputational damage, and may be involved in litigation related to injuries caused by their products. Therefore, known security measures for many objects have drawbacks.

BRIEF DESCRIPTION OF THE INVENTION

In one aspect, a method for ensuring a user is permitted to conduct an activity is provided that includes the steps of capturing, using a computing device, data for a biometric modality of a user and identifying information of an object. The method also includes transmitting, via a network, the captured biometric modality data and identifying information to a computer and conducting a verification transaction based on the captured biometric modality data to verify the identity of the user. When the identity of the user is successfully verified, a verification transaction is conducted based on the captured object identifying information and the user is permitted to use the object to conduct the activity when the object is successfully verified.

In another aspect, a computer system for ensuring a user is permitted to conduct an activity is provided that includes an object, a computer, and a computing device. The object, computer, and computing device communicate via a network and the activity is operating an object. The computing device captures data for a biometric modality of a user and identifying information of the object, and transmits, via the network, the captured biometric modality data and identifying information to the computer. The computer conducts a verification transaction based on the captured biometric modality data to verify the identity of the user, and when the identity of the user is successfully verified, said computer conducts a verification transaction based on the captured object identifying information. When the object is successfully verified, the computer transmits, via the network, a successful result to the object and the object permits the user to conduct the activity.

In another aspect, a method for ensuring a user is permitted to conduct an activity includes capturing, using a computing device, data for a biometric modality of a user and identifying information of an object. Moreover, the method includes conducting, using the computing device, a verification transaction based on the captured biometric modality data to verify the identity of the user, and when the identity of the user is successfully verified, conducting a verification transaction based on the captured object identifying information. When the object is successfully verified, the user is permitted to use the object to conduct the activity.

In yet another aspect, a computing device for ensuring a user is permitted to conduct an activity is provided that includes a processor and a memory. The memory is configured to store data and the computing device is associated with a network. The memory is in communication with the processor and has instructions stored thereon which, when read and executed by the processor, cause the computing device to capture data for a biometric modality of a user and identifying information of an object, and conduct a verification transaction based on the captured biometric modality data to verify the identity of the user. When the identity of the user is successfully verified, the instructions when read and executed by the processor further cause the computing device to conduct a verification transaction based on the captured object identifying information, and transmit a message to the object with the successful result when the object is successfully verified. After receiving the message, the object permits the user to use the object to conduct the activity.

DETAILED DESCRIPTION OF THE INVENTION

Figure 1:
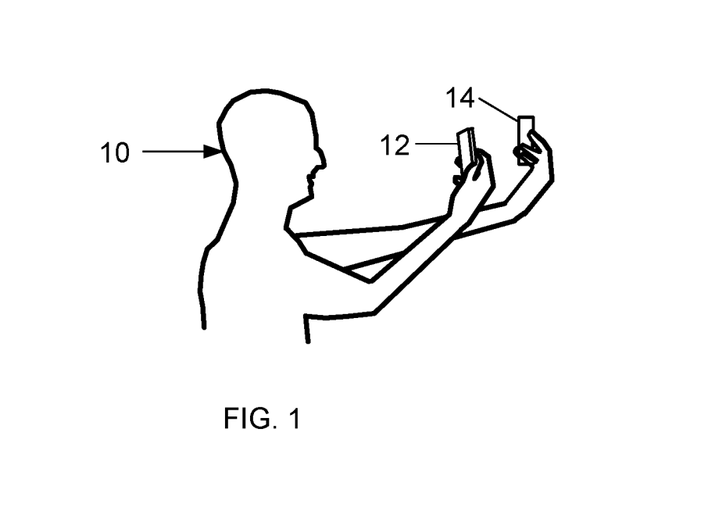
FIG. 1 is a side view of a user operating an example computing device to capture data of a biometric modality of a user and authentication data of an object.

FIG. 1 is a side view of a person 10 operating an example computing device 12 to capture data of a biometric modality from his or her self and authentication data of an example object 14. The person from whom such data is caught is referred to herein as a user 10. The user 10 typically operates the computing device 12 during capture. However, a different person may operate the computing device 12 while the computing device 12 captures data of a biometric modality of the user 10.

Figure 2:
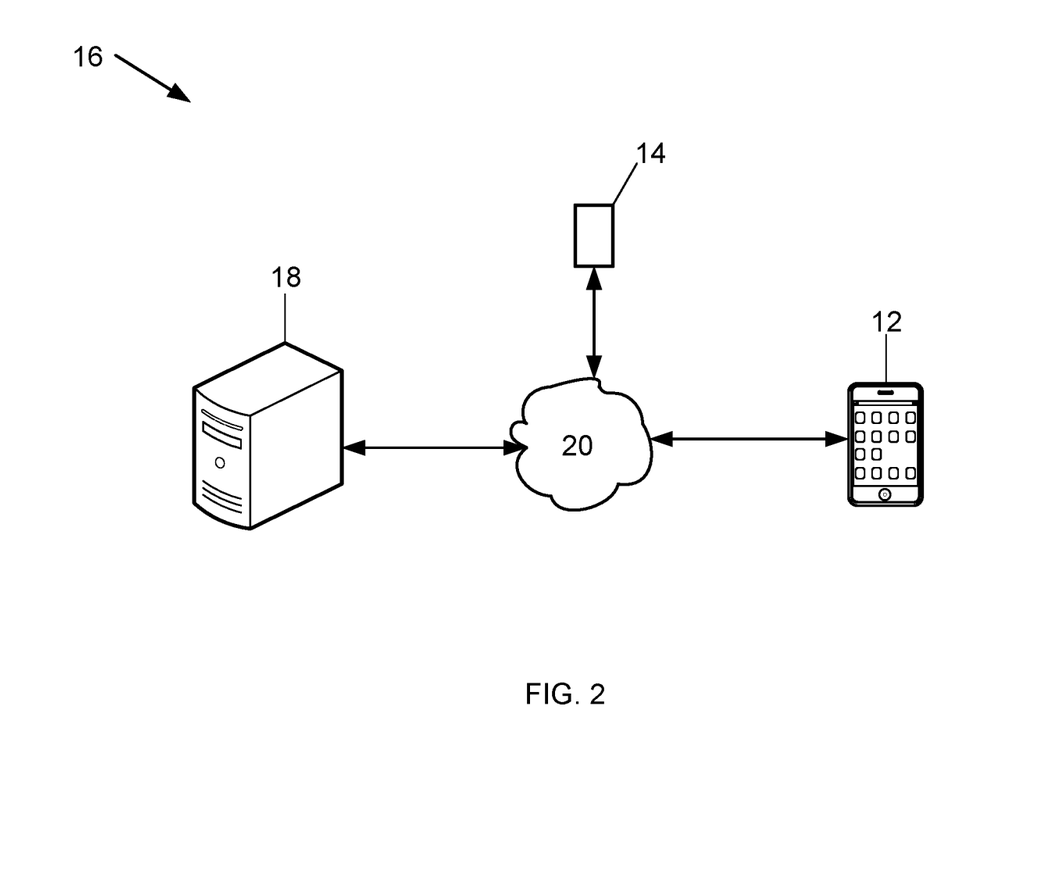
FIG. 2 is a schematic diagram illustrating an example system for ensuring a user is permitted to use to object to conduct an activity.

FIG. 2 is a schematic diagram illustrating an example system 16 for ensuring a user is permitted to use the object 14 to conduct an activity. The system 16 includes an example computer 18, the computing device 12, and a network 20. The computer 18 and the computing device 12 communicate via the network 20. Although one computing device 12 is shown, it is contemplated that the computing device 12 is representative of any number of computing devices 12 that may be included in the system 16.

Figure 3:
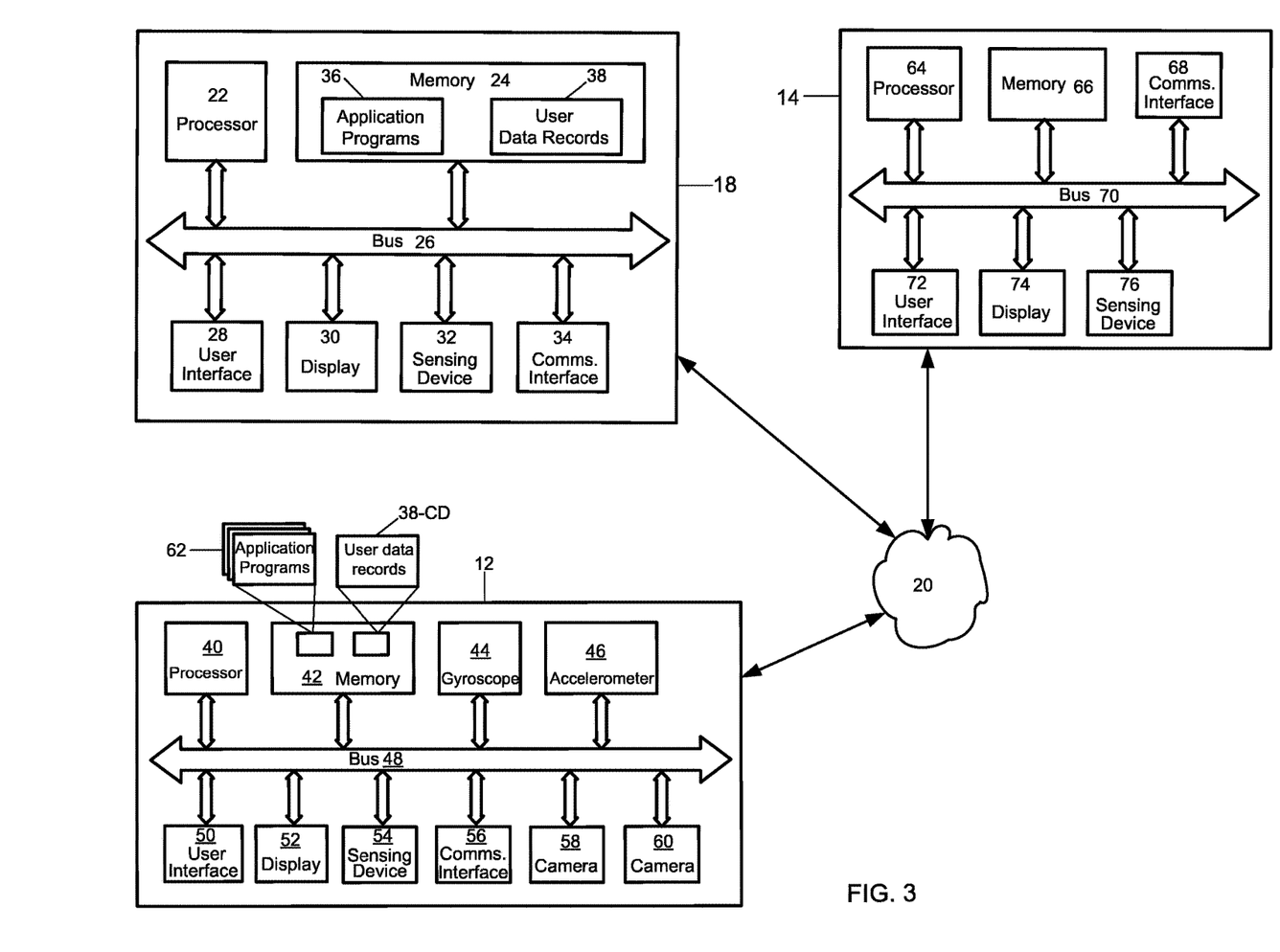
FIG. 3 is a schematic diagram illustrating an example architecture of an example computer, and example computing device, and an example object included in the system.

FIG. 3 is a schematic diagram illustrating an example architecture of the computer 18, the computing device 12, and the object 14 in the system 16 used for ensuring a user is permitted to use the object 14 to conduct an activity. The computer 18 may be a network server, a personal computer (PC), or any other computing device that can store data, communicate over networks, and is capable of performing the functions described herein. The computer 18 includes components such as, but not limited to, one or more processors 22, a memory 24, a bus 26, a user interface 28, a display 30, a sensing device 32, and a communications interface 34. General communication between the components in the computer 18 is provided via the bus 26.

The processor 22 executes instructions, or computer programs, stored in the memory 24. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

As used herein, the term "computer program" is intended to encompass an executable program that exists permanently or temporarily on any non-transitory computer-readable recordable medium that causes the computer 18 to perform at least a portion of the functions and/or methods described herein. Application programs 36, also known as applications, are computer programs stored in the memory 24. Application programs 36 include, but are not limited to, an operating system, an Internet browser application, enrolment applications, authentication applications, liveness detection applications, face tracking applications, applications that use pre-trained models based on machine learning algorithms, feature vector generator applications, and any special computer program that manages the relationship between application software and any suitable variety of hardware that helps to make-up a computer system or computing environment. Authentication applications enable the computing device 18 to conduct verification and identification (1:N) transactions for users and objects with any type of authentication data, where "N" is a number of candidates.

The memory 24 may be any non-transitory computer-readable recording medium used to store data including, but not limited to, computer programs 36 and user data records 38. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the non-transitory computer-readable recording media may be implemented as smart cards, SIMs, any type of physical and/or virtual storage, or any other digital source such as a network or the Internet from which a computing device can read computer programs, applications or executable instructions.

The data records 38 are typically for users enrolled in an authentication service offered by an entity operating the computer 18. The data record 38 for each user may include biometric modality data, biometric templates, data regarding objects 14 associated with each respective user, and personal data of the user. Biometric modalities include, but are not limited to, voice, face, finger, iris, palm, and any combination of these or other modalities. Biometric modality data is the data of a biometric modality of a person captured by the computing device 12 associated with that person. As used herein, capture means to record data temporarily or permanently. Data that may be captured includes as an example biometric modality data of a person. Biometric modality data may be in any form including, but not limited to, image data and audio data. Image data may be a digital image, a sequence of digital images, or a video. Each digital image is included in a frame. The biometric modality data in the data record may be processed to generate at least one biometric modality template.

Data regarding objects 14 that may be associated with a user include the type of object, for example, a vaping device, a vehicle, and an electronic lock installed on a door for ingress and/or egress or installed, for example, on a medicine cabinet. The object data may also include identifying information for each object, for example, a serial number.

The process of verifying the identity of a user or of an object is known as a verification transaction. Typically, during a biometric verification transaction a biometric template is generated from biometric modality data of a user captured during the transaction. The generated biometric template is compared against the corresponding record biometric template of the user and a matching score is calculated for the comparison. If the matching score meets or exceeds a threshold score, the identity of the user is verified as true. Alternatively, the captured user biometric modality data may be compared against the corresponding record biometric modality data to verify the identity of the user. Verifying the identity of an object is similar, except the identifying information is compared against record identifying information to determine a match.

An authentication data requirement is the data desired to be captured during a verification or identification transaction. For biometric authentication transactions, the authentication data is biometric modality data. For non-biometric authentication transactions, the authentication data may be any identifying information of the object 14, for example, pass phrases, usernames, and serial numbers.

For the example methods described herein, the authentication data requirement for biometric authentication transactions is for the face of the user. However, the authentication data requirement may alternatively be for any biometric modality or any combination of biometric modalities.

Biometric modality data may be captured by the computing device 12 in any manner. For example, for voice biometric data the computing device 12 may record a user speaking. For face biometric data, a camera included in the computing device 12 associated with a user may record image data of the face of the user by taking one or more photographs or digital images of the user, or by taking a video of the user. The camera may record a sequence of digital images at irregular or regular intervals. A video is an example of a sequence of digital images being captured at a regular interval. Captured biometric modality data may be temporarily or permanently stored in the computing device 12, the computer 18, or any device capable of communicating with the computing device 12. Alternatively, the biometric modality data may not be stored.

The user interface 28 and the display 30 allow interaction between a user and the computer 18. The display 30 may include a visual display or monitor that displays information to a user. For example, the display 30 may be a Liquid Crystal Display (LCD), active matrix display, plasma display, or cathode ray tube (CRT). The user interface 28 may include a keypad, a keyboard, a mouse, an illuminator, a signal emitter, a microphone, and/or speakers.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the user to interact with the computer 18 to enter data, change settings, control functions, etc. Consequently, when the touch screen is touched, the user interface 28 communicates this change to the processor 22, and settings can be changed or user entered information can be captured and stored in the memory 24.

The sensing device 32 may include Radio Frequency Identification (RFID) components or systems for receiving information from other devices. The sensing device 32 may alternatively, or additionally, include components with Bluetooth, Near Field Communication (NFC), infrared, or other similar capabilities. The computer 18 may alternatively not include the sensing device 32.

The communications interface 34 provides the computer 18 with two-way data communications. Moreover, the communications interface 34 enables the computer 18 to conduct wireless communications such as cellular telephone calls and to wirelessly access the Internet via the network 20. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet™ or an Asynchronous Transfer Model (ATM) network) to provide a data communication connection to a compatible LAN. As yet another example, the communications interface 34 may be a wire or a cable connecting the computer 18 with a LAN, or with accessories such as, but not limited to, other computing devices. Further, the communications interface 34 may include peripheral interface devices, such as a Universal Serial Bus (USB) interface, a PCMCIA (Personal Computer Memory Card International Association) interface, and the like. Thus, it should be understood the communications interface 34 may enable the computer 18 to conduct any type of wireless or wired communications such as, but not limited to, accessing the Internet. Although the computer 18 includes a single communications interface 34, the computer 18 may alternatively include multiple communications interfaces 34.

The communications interface 34 also allows the exchange of information across the network 20. The exchange of information may involve the transmission of radio frequency (RF) signals through an antenna (not shown). Moreover, the exchange of information may be between the computer 18 and any other computers (not shown), computer systems (not shown) and any other computing devices 12 (not shown) capable of communicating via the network 20. Examples of other computer systems (not shown) include computer systems of service providers such as, but not limited to, financial institutions, medical facilities, national security agencies, merchants, and authenticators. The computer systems (not shown) may alternatively be referred to as computing devices or information systems.

One example of the computing device 12 is a smart phone. Other examples include, but are not limited to, a cellular phone, a tablet computer, a phablet computer, a laptop computer, and any type of device having wired or wireless networking capabilities such as a personal digital assistant (PDA) with smart capabilities that is capable of connecting to the Internet, cellular networks, and interconnect with other devices via Wi-Fi and Bluetooth protocols. The computing device 12 is typically portable and may be associated with any individual or with any type of entity including, but not limited to, commercial and non-commercial entities. The computing device 12 is capable of performing at least the functions described herein for the computing device 12 and the functions described herein for the computer 18.

The computing device 12 includes components similar to those described herein for the computer 18. For example, the computing device 12 includes a processor 40, a memory 42, a user interface 50, a display 52, a sensing device 54, and a communications interface 56 which correspond to the processor 22, memory 24, user interface 28, display 30, sensing device 32 and communications interface 34 described herein for the computer 18. The memory 42 also includes applications 62 and user data records 38-CD. However, the user data records 38-CD are usually for those users that are associated with the computing device 12. The computing device 12 also includes a gyroscope 44 and one or more accelerometers 46 that generate data regarding rotation and translation of the computing device 12 that may be communicated to the processor 40 and the memory 42 via the bus 48. The computing device 12 may alternatively not include the gyroscope 44 or the accelerometer 46, or may not include either.

The computing device 12 also includes different cameras 58 and 60 which capture image data. The cameras 58 and 60 can be imaging devices configured to record image data of any object and at least a portion of the body of a user including any biometric modality of the user while utilizing the computing device 12. Moreover, the cameras 58 and 60 are capable of recording image data under any lighting conditions including infrared light. The cameras 58 and 60 may be integrated into the computing device 12 as one or more front-facing cameras and/or one or more rear facing cameras that each incorporates a sensor, for example and without limitation, a CCD or CMOS sensor. Typically, the cameras 58 and 60 do not operate simultaneously. The computing device 12 may alternatively be referred to as a computer system or information system. The computing device 12 may also capture fingerprint data.

The object 14 may be any object that may be associated with a user. For example, without limitation, the object 14 may be a vaping device, a vehicle like an automobile, motorcycle or boat, an electronic lock implemented on an apparatus or any kind of door like a medicine cabinet door, and an electronic control device like a TV controller. Additionally, the object 14 may be a dispenser used to administer medication.

Some objects 14 may include components similar to the components described herein for the computer 18 and some may not. For those that do, the object 14 may include a processor 64, a memory 66, a communications interface 68, a user interface 72, a display 74, and a sensing device 76 which correspond to the processor 22, memory 24, communications interface 34, user interface 28, display 30, and sensing device 32 described herein for the computer 18.

Moreover, the object 14 may have a QR Code affixed thereto or the object 14 may display the QR Code. The QR Code may encode any identifying information that may facilitate identifying the object 14 as being associated with a respective user. Instead of QR Code, the object 14 may include an electronic tag which transmits identifying information about the object 14 to other devices like the computing device 12. For example, the object 14 may include a Radio Frequency Identification (RFID) tag. Alternatively, or additionally, the object 14 may include components with Bluetooth, Near Field Communication (NFC), infrared, or other similar capabilities to otherwise communicate identifying information like a serial number or like data to a computing device 12.

The network 20 may be a 5G communications network. Alternatively, the network 20 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 20 may also be any type of wired network or a combination of wired and wireless networks.

Users may be required to successfully verify their identities before being permitted to operate an object 14 to conduct an activity like smoking a vaping device, opening a locked door, or operating a vehicle. However, some users have been known to spoof the verification process to fraudulently obtain permission to access and operate an object 14.

Figure 4:
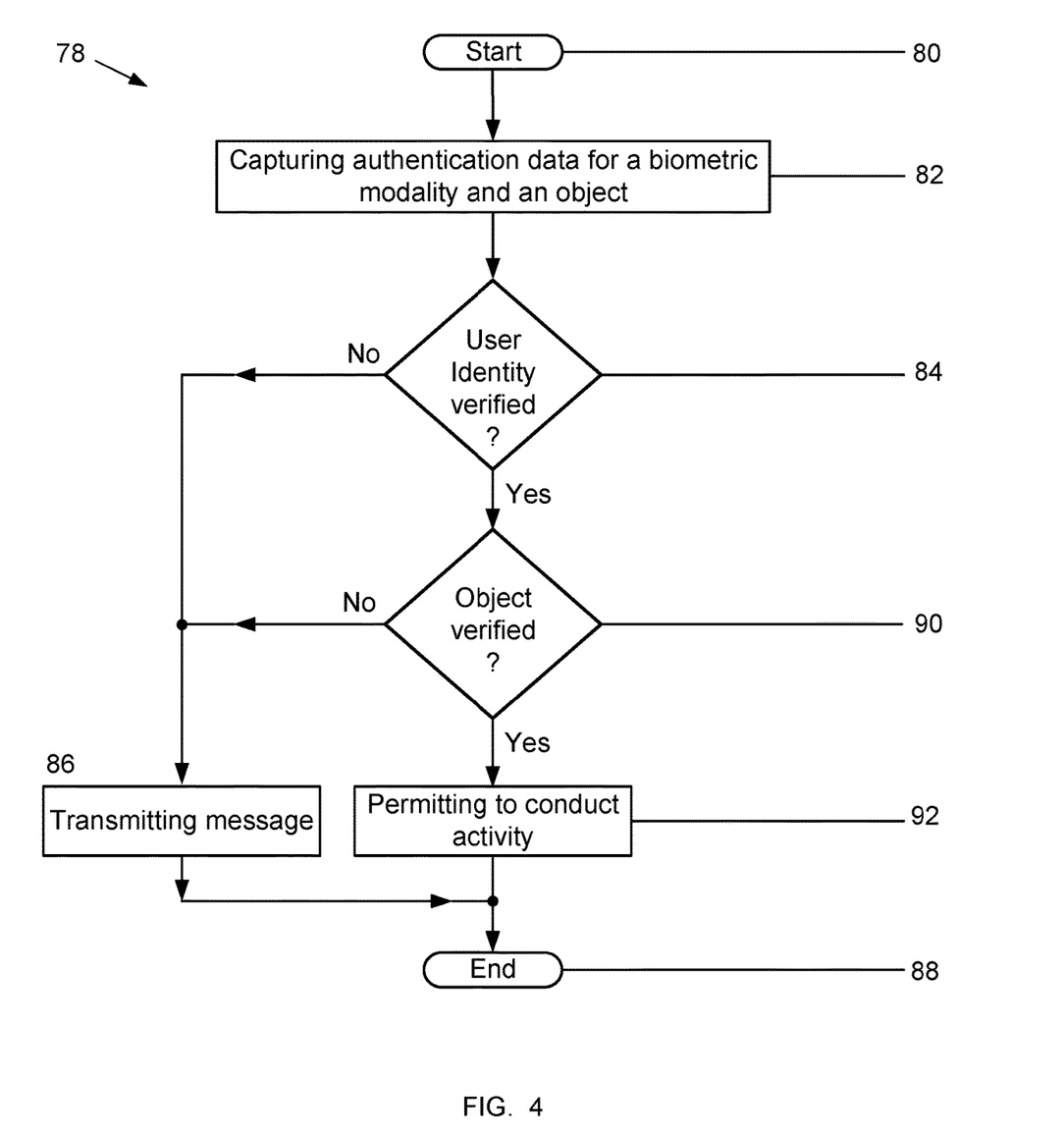
FIG. 4 is a flowchart illustrating an example method of ensuring a user is permitted to conduct an activity.

FIG. 4 is flowchart 78 illustrating an example method of ensuring a user is permitted to use an object to conduct an activity. This example method describes a rigorous verification method which uses biometric modality data and identification information of an object 14 to facilitate reducing fraudulently obtained permissions. More specifically, the method starts 80 by using the computing device 12 to capture 82 data for a biometric modality of a user and capture 82 identification information of the object 14. The identification information is encoded in a QR Code displayed by or affixed to the object 14 and may be any data that facilitates identifying the object 14 such as, but not limited to, a serial number.

One camera 58 included in the computing device 12 captures the biometric modality data and another camera 60 in the computing device 12 captures image data of the QR Code. Alternatively, the computing devise 12 may scan the QR Code to facilitate obtaining the data encoded therein. The cameras 58 and 60 may operate in any order to capture the biometric modality data and the identity information.

Next, the computing device 12 continues by transmitting to the computer 18 the captured biometric modality data and QR Code image data. In response, the computer 18 conducts a verification transaction 84 based on the captured biometric modality data. When the identity of the user is not successfully verified 84, a message including the unsuccessful result is transmitted 86 to the computing device 12 and processing ends 88. However, when the identity of the user is successfully verified 84 the computer 18 continues by obtaining the identification information from the QR Code image data and conducting another verification transaction 90 based on the obtained identification information.

When the identity of the object 14 is not successfully verified 90, a message including the unsuccessful result is transmitted 86 to the computing device 12 and processing ends 88. However, when the identity of the object 14 is successfully verified 90, the user is permitted to use the object 14 to conduct an activity. Thus, the computer 18 continues by transmitting a message to the object 14 indicating the user is permitted 92 to access and use the object 14 to conduct an activity using the object 14, and/or to access and use any function of the object 14. Next, processing ends 88.

Figure 5:
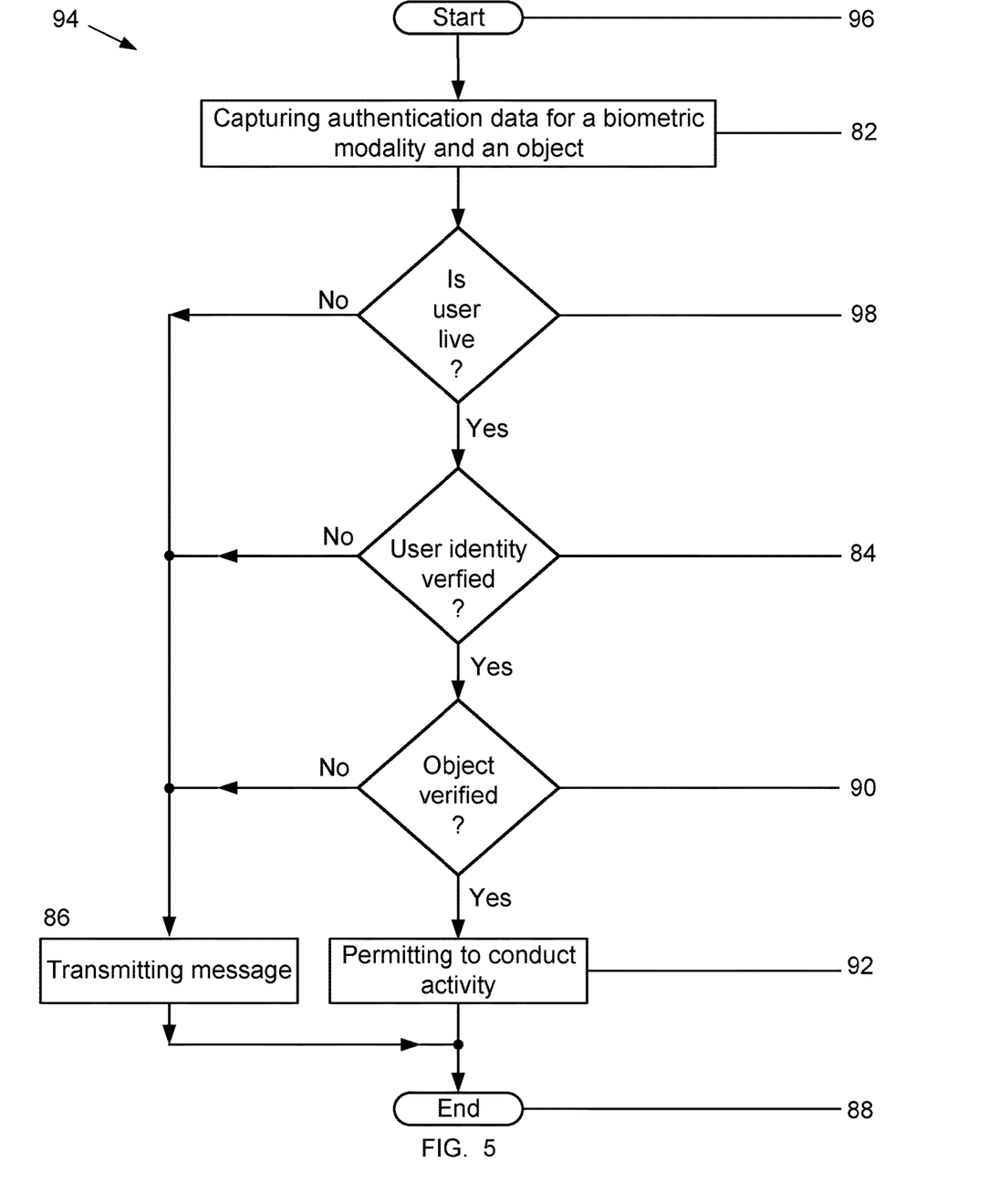
FIG. 5 is a flowchart illustrating an alternative example method of ensuring a user is permitted to conduct an activity.

The information shown in FIG. 5 is the same information shown in FIG. 4 as described in more detail below. As such, features illustrated in FIG. 5 that are identical to features illustrated in FIG. 4 are identified using the same reference numerals used in FIG. 4.

FIG. 5 is a flowchart 94 illustrating an alternative example method of ensuring a user is permitted to use an object to conduct an activity. This alternative method is similar to that shown in FIG. 4. However, after capturing 82 and transmitting the biometric modality data and the identification information to the computer 18, the computer 18 continues by determining 98 whether or not the biometric modality data is of a live person. Any method for determining liveness may be used. When the biometric modality data is not of a live person, the computer 18 continues by transmitting 86 a message including the unsuccessful result to the computing device 12 and processing ends 88. However, when the biometric modality data is of a live person, the computer 18 continues by conducting the verification 84 transaction and conducting operations 86, 88, 90 and 92 as described herein with regard to FIG. 4.

Although the computing device 12 transmits the captured biometric modality data and the captured identification information to the computer 18 in the example method described herein, the computing device 12 may alternatively not transmit the captured biometric modality data and identification information. Instead, the computing device 12 may store temporarily or permanently the captured biometric modality data and object identification information therein, and perform steps 84, 86, 88, 90 and 98 as described herein with regard to FIGS. 4 and 5.

The example methods described herein may be conducted entirely by the computing device 12, or partly on the computer 18 and partly on the computing device 12, or partly on the computer 18 and partly on the computing device 12 and computer systems (not shown) operable to communicate with the computer 18 via the network 20. Moreover, the example methods described herein may be conducted entirely on the other computer systems (not shown) and other computing devices (not shown). Thus, the example methods may be conducted on any combination of computers, computer systems, and computing devices. Furthermore, data described herein as being stored in the memories 24, 42, 66 may alternatively be stored in any computer system (not shown) or computing device (not shown) operable to communicate with the computer 18 via the network 20. Additionally, the example methods described herein may be implemented with any number and organization of computer program components. Thus, the methods described herein are not limited to specific computer-executable instructions. Alternative example methods may include different computer-executable instructions or components having more or less functionality than described herein.

In example embodiments, the above-described methods and systems for ensuring a user is permitted to use an object to conduct an activity facilitate reducing the number of unauthorized users who may operate an object to their detriment, the object owner's detriment, and/or the object manufacturer's detriment. More specifically, in one example embodiment, a computing device captures data for a biometric modality of a user and captures identification information of an object. The identification information is encoded in a QR Code displayed by or affixed to the object and may be any data that facilitates identifying the object such as, but not limited to, a serial number. One camera in the computing device captures the biometric modality data and another camera in the computing device captures image data of the QR Code.

The computing device transmits to the computer the captured biometric modality data and QR Code image data. The computer 18 conducts verification transactions based on the captured biometric modality data and identification information obtained from the QR Code image data. When the identity of the user is successfully verified based on the captured biometric modality data and the identification information, the user is granted permission to use the object to conduct an activity.

As a result, in each example embodiment, the number of unauthorized users who may use objects to their detriment, the object owner's detriment, and/or the object manufacturer's detriment is facilitated to be reduced and thus the security of objects is facilitated to be enhanced. For example, when the object is a vaping device, users have been known to suffer unexplained illnesses and death as a result of using the vaping device. The methods and systems described herein facilitate reducing such unexplained illnesses and death. Moreover, the methods and systems described herein facilitate reducing the likelihood that owners and/or manufacturers of such objects will be subject to litigation relating to such illnesses and deaths and facilitate reducing the reputational damage that may be suffered by the owners and/or manufacturers of such objects as a result of such unexplained illnesses and deaths.

The example methods and systems for ensuring a user is permitted to use an object to conduct an activity described above should not be considered to imply a fixed order for performing the method steps. Rather, the method steps may be performed in any order that is practicable, including simultaneous performance of at least some steps. Moreover, the method steps may be performed in real time or in near real time. It should be understood that, for any process described herein, there can be additional, fewer, or alternative steps performed in similar or alternative orders, or in parallel, within the scope of the various embodiments, unless otherwise stated. Furthermore, the invention is not limited to the embodiments of the methods described above in detail. Rather, other variations of the methods may be utilized within the spirit and scope of the claims.

What is claimed is:

1. A method for ensuring a user is permitted to conduct an activity comprising the steps of:
    capturing, using a computing device, data for a biometric modality of a user and identifying information of an object;
    transmitting, via a network, the captured biometric modality data and identifying information to a computer;
    conducting a verification transaction based on the captured biometric modality data to verify the identity of the user;
    when the identity of the user is successfully verified, conducting a verification transaction based on the captured object identifying information; and
    permitting the user to use the object to conduct the activity when the object is successfully verified, wherein the activity is operating the object.

2. The method for ensuring a user is permitted to conduct an activity according to claim 1, said capturing step further comprising:
    capturing, using a first camera included in the computing device, the data for the biometric modality of the user; and
    capturing, using a second camera included in the computing device, the identifying information of the object.

3. The method for ensuring a user is permitted to conduct an activity according to claim 1, wherein the biometric modality of the user is fingerprint and the identifying information of the object is captured from an electronic tag.

4. The method for ensuring a user is permitted to conduct an activity according to claim 1, said permitting step comprising permitting, by the object, the user to operate the object.

5. The method for ensuring a user is permitted to conduct an activity according to claim 1, said permitting step comprising permitting the user to conduct functions using the object that require user authentication.

6. The method for ensuring a user is permitted to conduct an activity according to claim 1, further comprising determining whether the captured biometric data is of a live person.

7. The method for ensuring a user is permitted to conduct an activity according to claim 1, said capturing object identifying information step comprising capturing image data of a QR code of the object.

8. A computer system for ensuring a user is permitted to conduct an activity comprising:
    an object;
    a computer; and
    a computing device, wherein
    said object, said computer and said computing device communicate via a network, and the activity is operating the object,
    said computing device captures data for a biometric modality of a user and identifying information of the object, and transmits, via the network, the captured biometric modality data and identifying information to said computer,
    said computer, conducts a verification transaction based on the captured biometric modality data to verify the identity of the user, and when the identity of the user is successfully verified, said computer conducts a verification transaction based on the captured object identifying information, and
    when the object is successfully verified, said computer transmits, via the network, a successful result to the object and the object permits the user to conduct the activity.

9. The computer system according to claim 8, wherein said computing device comprises a first camera and a second camera, the first camera captures the biometric modality data and the second camera captures the object identifying information during the same transaction.

10. The computer system according to claim 8, wherein the object unlocks to permit the user to conduct the activity.

11. The computer system according to claim 8, wherein said computer determines whether the captured biometric modality data is of a live person.

12. The computer system according to claim 8, wherein the object identifying information comprises image data of a QR code of the object.

13. A method for ensuring a user is permitted to conduct an activity comprising the steps of:

capturing, using a computing device, data for a biometric modality of a user and identifying information of an object;

conducting, using the computing device, a verification transaction based on the captured biometric modality data to verify the identity of the user;

when the identity of the user is successfully verified, conducting a verification transaction based on the captured object identifying information; and permitting the user to use the object to conduct the activity when the object is successfully verified, wherein the activity is operating the object.

14. The method for ensuring a user is permitted to conduct an activity according to claim 13, said capturing step further comprising:

capturing, using a first camera included in the computing device, the data for the biometric modality of the user; and capturing, using a second camera included in the computing device, the identifying information of the object.

15. The method for ensuring a user is permitted to conduct an activity according to claim 13, wherein the identifying information of the object is captured from an electronic tag.

16. The method for ensuring a user is permitted to conduct an activity according to claim 13, said conducting a verification transaction step further comprising determining whether the captured biometric modality data is of a live person.

17. A computing device for ensuring a user is permitted to conduct an activity comprising:

a processor; and a memory configured to store data, said computing device being associated with a network and said memory being in communication with said processor and having instructions stored thereon which, when read and executed by said processor, cause said computing device to capture data for a biometric modality of a user and identifying information of an object, conduct a verification transaction based on the captured biometric modality data to verify the identity of the user, when the identity of the user is successfully verified, conduct a verification transaction based on the captured object identifying information, and when the object is successfully verified, transmit a message to the object with the successful result, wherein the object permits the user to use the object to conduct the activity and the activity is operating the object.

18. A computing device for ensuring a user is permitted to conduct an activity according to claim 17, wherein the instructions, when read and executed by said processor, cause said computing device to:

capture, using a first camera included in said computing device, the data for the biometric modality of the user; and capture, using a second camera included in said computing device, the identifying information of the object.

19. A computing device for ensuring a user is permitted to conduct an activity according to claim 17, wherein the identifying information of the object is captured from an electronic tag.

20. A computing device for ensuring a user is permitted to conduct an activity according to claim 17, wherein the instructions, when read and executed by said processor, cause said computing device to determine whether the captured biometric modality data is of a live person.

* * * * *